United States Patent
Uno

(10) Patent No.: US 8,641,065 B2
(45) Date of Patent: Feb. 4, 2014

(54) BATTERY-POWERED TOWING TRACTOR

(75) Inventor: Seiji Uno, Aichi-ken (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 232 days.

(21) Appl. No.: 12/938,705

(22) Filed: Nov. 3, 2010

(65) Prior Publication Data

US 2011/0108337 A1    May 12, 2011

(30) Foreign Application Priority Data

Nov. 6, 2009    (JP) ................ 2009-255416

(51) Int. Cl.
*B62D 21/00*    (2006.01)

(52) U.S. Cl.
USPC ........... 280/124.109; 280/781; 280/124.17; 280/124.175; 280/124.1; 296/29; 296/30; 296/204; 296/203.04; 180/65.1

(58) Field of Classification Search
USPC .......... 280/124.1, 124.109, 124.11, 124.164, 280/124.17, 124.175, 781, 787, 788, 280/795–800; 180/65.1; 296/193.07, 296/203.04, 204, 29, 30; 267/260
See application file for complete search history.

(56) References Cited

U.S. PATENT DOCUMENTS

| | | | | |
|---|---|---|---|---|
| 804,341 A | * | 11/1905 | Plumb | 267/260 |
| 1,929,717 A | * | 10/1933 | Symington | 105/186 |
| 3,194,580 A | * | 7/1965 | Hamlet | 280/682 |
| 3,517,765 A | * | 6/1970 | Eggert, Jr. et al. | 180/312 |
| 4,317,497 A | | 3/1982 | Alt et al. | |
| 4,834,424 A | * | 5/1989 | Link | 280/785 |
| 5,123,805 A | * | 6/1992 | Ishimori et al. | 414/686 |
| 5,228,531 A | * | 7/1993 | Patterson et al. | 180/68.5 |
| 6,129,369 A | * | 10/2000 | Dudding | 280/124.175 |
| 6,732,825 B2 | | 5/2004 | Takeda | |
| 7,077,411 B2 | * | 7/2006 | Peters et al. | 280/124.132 |
| 7,213,825 B2 | * | 5/2007 | Hitt et al. | 280/124.163 |
| 7,237,829 B2 | * | 7/2007 | Latimer et al. | 296/187.11 |
| 8,113,311 B2 | * | 2/2012 | Herrmann et al. | 180/68.5 |
| 2002/0017407 A1 | | 2/2002 | Takeda | |
| 2004/0183271 A1 | * | 9/2004 | Galazin et al. | 280/124.128 |
| 2009/0174171 A1 | * | 7/2009 | Maiorana et al. | 280/423.1 |

FOREIGN PATENT DOCUMENTS

| | | |
|---|---|---|
| JP | 2002-331958 A | 11/2002 |
| JP | 2004-231040 A | 8/2004 |
| WO | 2008/132909 A1 | 11/2008 |
| WO | WO 2008132909 A1 * | 11/2008 |

OTHER PUBLICATIONS

Australian Examination Report for corresponding Australian Patent Application No. 2010238547 dated Apr. 7, 2011.
Official Communication received Jan. 21, 2013 for corresponding German Patent Application No. 10 2010 043 503.1.

* cited by examiner

*Primary Examiner* — John R Olszewski
*Assistant Examiner* — Steve Clemmons
(74) *Attorney, Agent, or Firm* — Sughrue Mion, PLLC

(57) ABSTRACT

The battery-powered towing tractor includes a front wheel, a rear wheel, a body, a battery, a member plate, a front reinforcing plate and a rear reinforcing plate. The body has a floor formed between the front wheel and the rear wheel. The battery is disposed in the body at a position between the front wheel and the floor. The member plate extends in width direction of the body for compartmenting a rear end of the floor in the body. The front reinforcing plate is joined to a front surface of the member plate. The rear reinforcing plate is joined to a rear surface of the member plate. The front reinforcing plate and the rear reinforcing plate are opposed across the member plate.

8 Claims, 4 Drawing Sheets

BATTERY-POWERED TOWING TRACTOR

BACKGROUND OF THE INVENTION

The present invention relates to a battery-powered towing tractor wherein a floor is formed in the body of the tractor at a position between the front wheels and the rear wheels and a battery is disposed between the floor and the front wheels.

Towing tractor which employs an engine as a drive unit has been used. In such an engine-powered towing tractor, the engine is disposed in the body of the towing tractor at a position that is forward of the operator's compartment and at a level that is higher than the front wheels. In recent years, towing tractor which employs a motor as the drive unit and a battery for driving the motor has been also used. Since the battery of such towing tractor is large in height, width and depth, it is difficult to dispose the battery as in the case of an engine-powered towing tractor. Therefore, the battery of the battery-powered towing tractor is disposed in the tractor body at a position that is forward of the operator's compartment and between the front wheels and the floor.

In a general frame of the above battery-powered towing tractor, a member plate extending in width direction of the tractor body is usually provided between the rear wheels and the floor. Japanese Patent Application Publication No. 2002-331958 discloses such a frame of vehicle body.

Referring to FIG. 5 showing the frame of the vehicle body according to the cited reference, the rear side member 90 (referred to as the rear side rail in the reference) which forms the frame has a front end face 90A which is fixed to the upper part 91A of the suspension bracket 91 (referred to as the suspension support in the reference). The front part 91B of the suspension bracket 91 is fixed to the member plate 92 (referred to as the outrigger in the reference). The suspension bracket 91 supports a rear suspension 93.

A battery-powered towing tractor having a battery in the tractor body at a position that is forward of the operator's compartment and between the front wheels and the floor is larger in the distance between the front wheels and the floor as measured in the longitudinal direction of the tractor body than the engine-powered towing tractor. The distance between the rear wheels and the floor of the battery-powered towing tractor in the longitudinal direction thereof is smaller than that of the engine-powered towing tractor to reduce the wheelbase of the battery-powered towing tractor instead.

In the battery-powered towing tractor, the front and rear wheels receive upward force from the road surface while the body receives the load of the battery. Due to such upward force and battery load, the stress concentrates in the member plate 92 which forms the part of the body between the rear wheels and the floor. However, the member plate 92 which is disposed in a short part in the longitudinal direction of the tractor does not have thickness enough to resist the stress. To reinforce the member plate 92, the frame of the vehicle body disclosed by the reference should be additionally reinforced.

The present invention is directed to a battery-powered towing tractor having a battery disposed between the floor and the front wheels, wherein the member plate is reinforced.

SUMMARY OF THE INVENTION

In accordance with an aspect of the present invention, the battery-powered towing tractor includes a front wheel, a rear wheel, a body, a battery, a member plate, a front reinforcing plate and a rear reinforcing plate. The body has a floor formed between the front wheel and the rear wheel. The battery is disposed in the body at a position between the front wheel and the floor. The member plate extends in width direction of the body for compartmenting a rear end of the floor in the body. The front reinforcing plate is joined to a front surface of the member plate. The rear reinforcing plate is joined to a rear surface of the member plate. The front reinforcing plate and the rear reinforcing plate are opposed across the member plate.

Other aspects and advantages of the invention will become apparent from the following description, taken in conjunction with the accompanying drawings, illustrating by way of example the principles of the invention.

BRIEF DESCRIPTION OF THE DRAWINGS

The invention together with objects and advantages thereof, may best be understood by reference to the following description of the presently preferred embodiments together with the accompanying drawings in which.

DETAILED DESCRIPTION OF THE PREFERRED EMBODIMENTS

The following will describe the battery-powered towing tractor according to the embodiment of the present invention with reference to FIGS. 1 to 4. The battery-powered towing tractor will be hereinafter referred to merely as a towing tractor. The terms "front," "rear," "right," "left," "upper" and "lower" in the following description will be used as viewed from a towing tractor operator facing forward.

Figure 1:
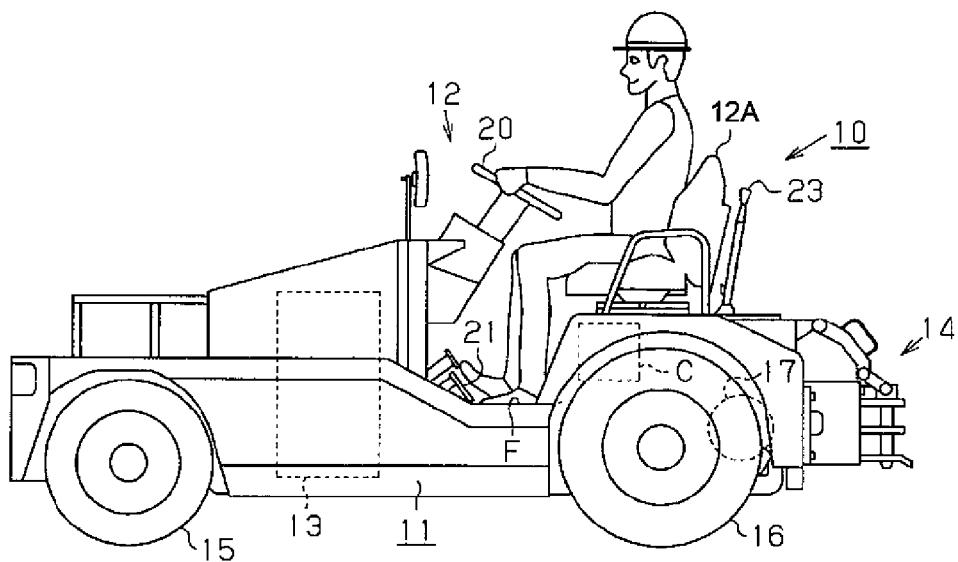
FIG. 1 is a side view showing a battery-powered towing tractor according to an embodiment of the present invention.

Referring to FIG. 1 showing the side view of the towing tractor 10, the body 11 of the towing tractor 10 has in the rear thereof a floor F on which an operator's compartment 12 with a seat 12A is formed. The body 11 has a drawbar unit 14 behind the operator's compartment 12. A pair of front wheels 15 is provided at the front bottom of the body 11 and a pair of rear wheels 16 is provided at the rear bottom of the body 11. The body 11 has at a position between the front wheels 15 and the floor F a battery compartment (not shown) in which a battery 13 is disposed.

Figure 3:
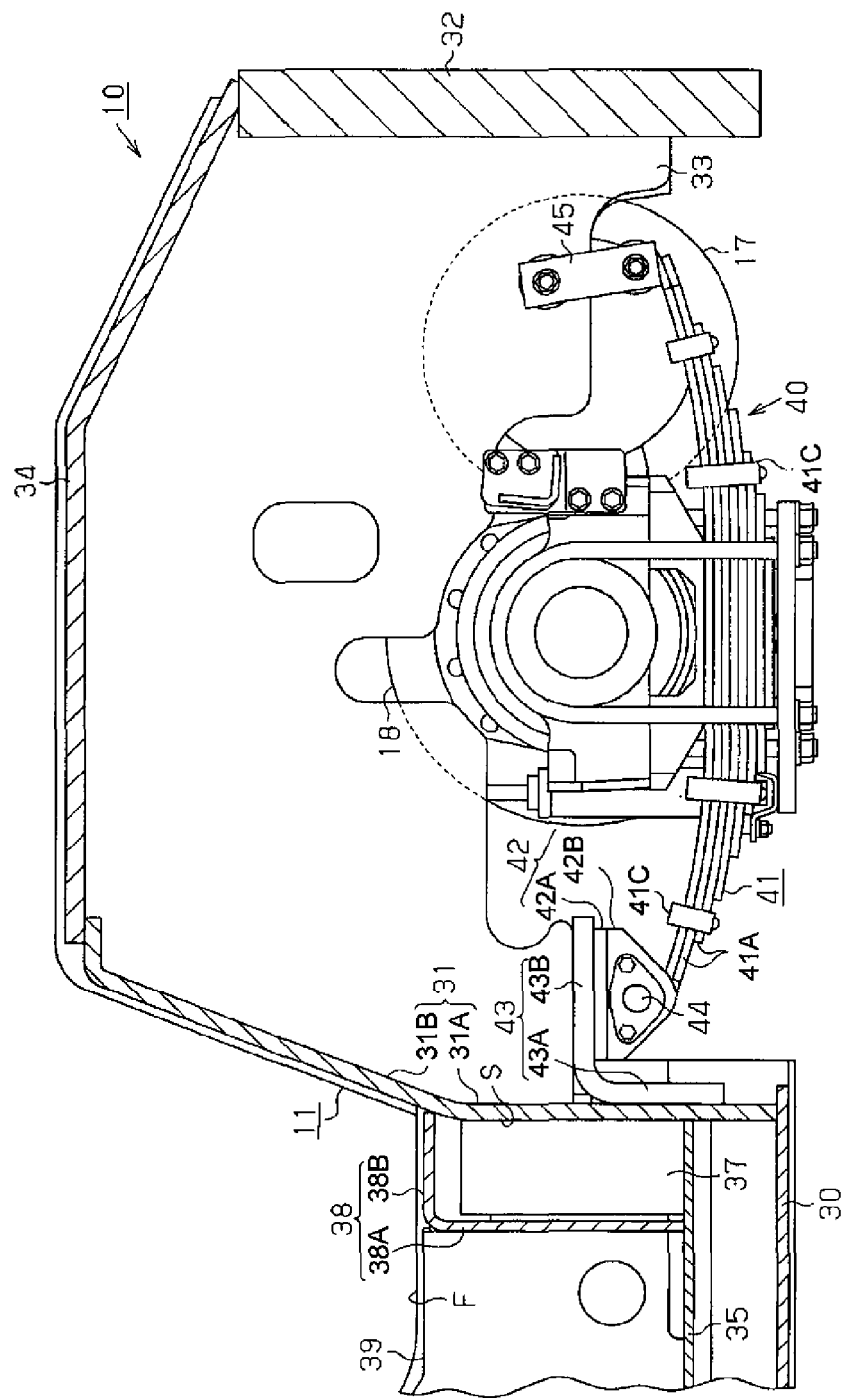
FIG. 3 is a partially sectional side view showing the suspension of the battery-powered towing tractor and its related parts.

Referring to FIG. 3 showing the side view of the rear of the body 11, a drive motor 17 as a drive unit is disposed in the rear of the body 11. A rear axle housing 18 housing an axle shaft (not shown) and supporting the load of the rear of the body 11 is disposed forward of the drive motor 17 so as to extend laterally of the body 11.

A power transmission device (not shown) is connected to the rear axle housing 18 and the drive motor 17 for transmitting driving force of the drive motor 17 to the axle shaft (not shown). The rear axle housing 18 and the drive motor 17 are connected together. In addition, a controller C (shown in FIG. 1) is disposed forward of the rear axle housing 18 and the drive motor 17 for controlling the driving force of the drive motor 17. The towing tractor 10 is powered by the battery 13 so as to transmit the driving force of the drive motor 17 to the rear wheels 16 via the axle shaft.

As shown in FIG. 1, the operator's compartment 12 has a steering wheel 20 in front of the seat 12A and an accelerator pedal 21 on the floor F. The operator's compartment 12 has a parking brake lever (not shown) beside the seat 12A and a drawbar lever 23 behind the seat 12A for operating the drawbar unit 14.

Figure 4A:
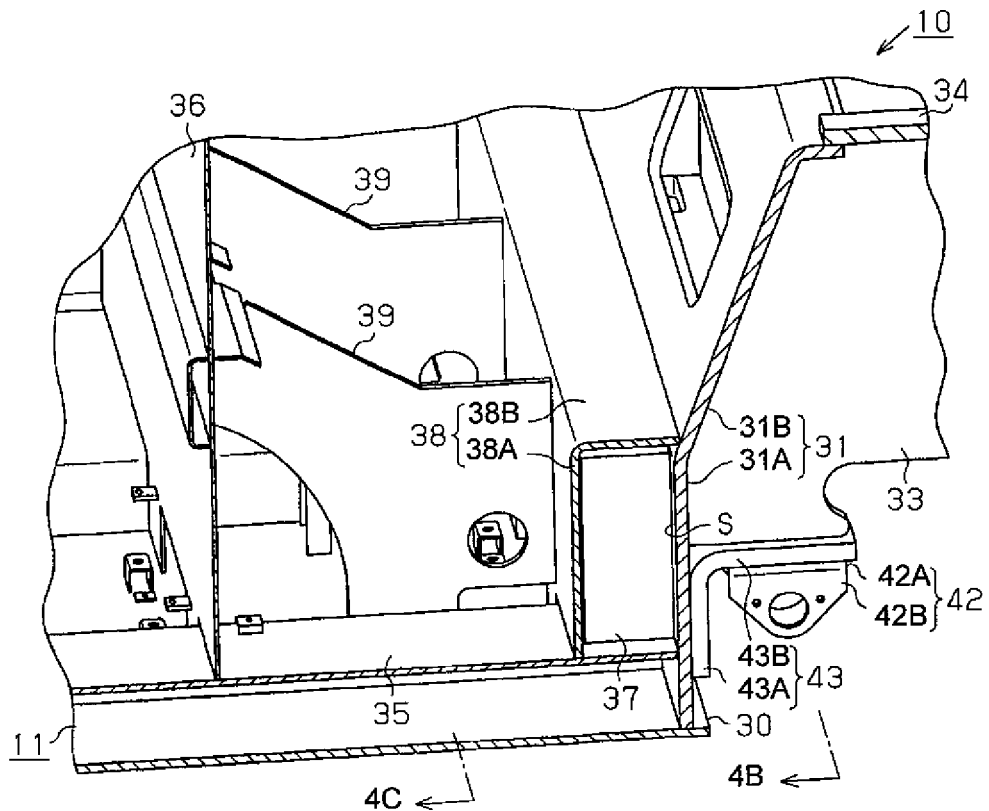
FIG. 4A is a partially sectional perspective view showing a part of the frame of the body of the battery-powered towing tractor.

The following will describe the frame of the body 11. Referring to FIG. 4A showing the frame of the body 11 adjacent to the operator's compartment 12, the frame of body 11 has an under plate 30 that forms the bottom of the body 11, and a member plate 31 disposed on the under plate 30 at the rear thereof, extending laterally of the body 11 (or in width direction) of the under plate 30. The member plate 31 has a base portion 31A that extends perpendicular to the under plate 30 and a partition portion 31B that extends from the upper end of the base portion 31A diagonally rearward. The base portion 31A of the member plate 31 is at a level that is the lowest in the body 11, thus forming a neck of the body 11 that separates a rear part of the body 11 that houses the rear wheels 16 and the floor F.

Figure 2:
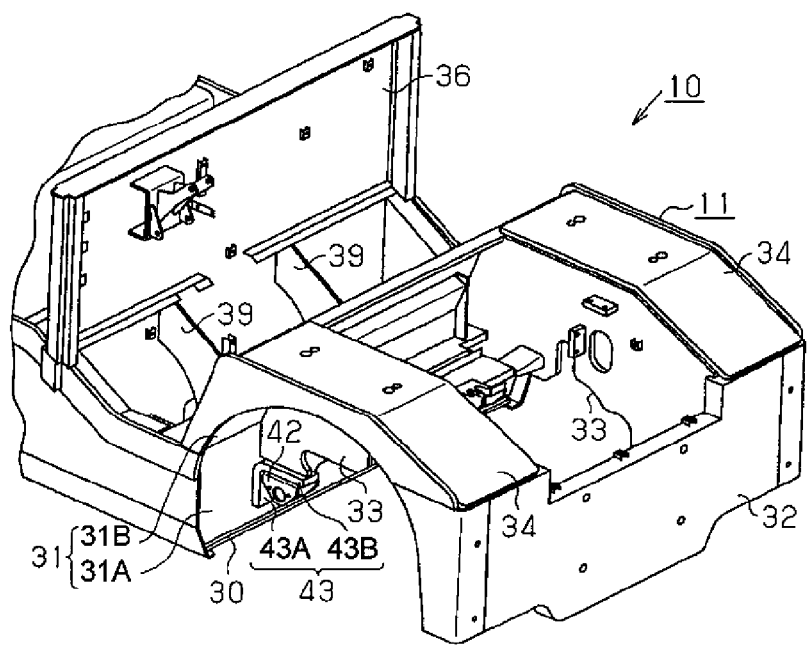
FIG. 2 is a fragmentary perspective view showing the rear of the battery-powered towing tractor of FIG. 1.

Referring to FIG. 2 showing the perspective view of the rear of the body 11, the frame of the body 11 has a rear cross member 32 behind the member plate 31. A pair of rear side members 33 extends in the longitudinal direction of the body 11 between the member plate 31 and the rear cross member 32. The paired rear side members 33 are spaced at a predetermined distance in the width direction of the body 11. The member plate 31, the rear cross member 32, the paired rear side members 33 cooperate to form a space in which the drive motor 17, the rear axle housing 18 and the controller C are disposed. A rear side cover 34 is disposed on each rear side member 33, extending between the member plate 31 and the rear cross member 32.

Figure 4B:
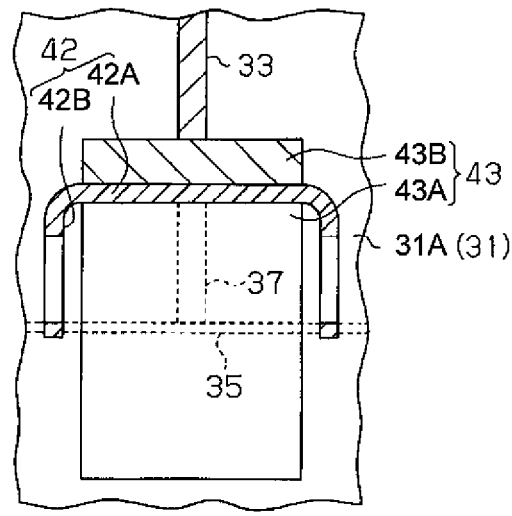
FIG. 4B is a cross sectional view showing a suspension bracket of the suspension taken along the line 4B of FIG. 4A.
Figure 4C:
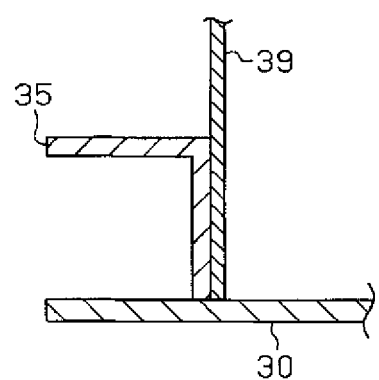
FIG. 4C is a cross sectional view showing a lower part of the frame taken along the line 4C of FIG. 4A.
Figure 5:
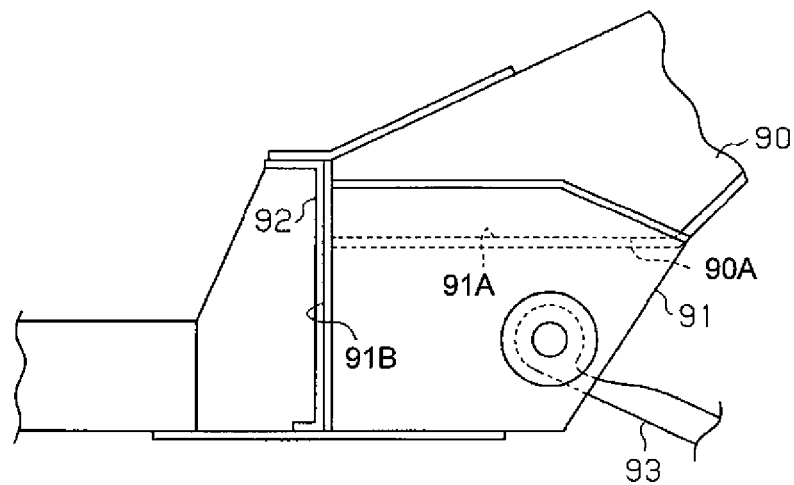
FIG. 5 is a fragmentary cross sectional view showing the frame of vehicle body according to background art.

As shown in FIGS. 3, 4A and 4C, a pair of side plates 35 (only one being shown) each having an L-shape in cross section and extending in the longitudinal direction of the body 11 are joined to the under plate 30 on the opposite sides thereof. Each side plate 35 and the under plate 30 have therebetween space that extends in the vertical direction and the longitudinal direction of the body 11 at predetermined intervals, respectively. Each side plate 35 is joined at the rear end face thereof to the lower end of the front surface of the base portion 31A of the member plate 31.

As shown in FIGS. 2 and 4A, the frame of the body 11 has a front protector 36 extending laterally of the body 11 and forward of the member plate 31. The front protector 36 is joined at the bottom thereof to the upper surface of the under plate 30 and extends in perpendicular relation to the under plate 30. The steering wheel 20 and various control members (not shown) are mounted on the front protector 36. The floor F is compartmented in the body 11 in the rear end thereof by the partition portion 31B of the member plate 31 and in the front end thereof by the front protector 36.

A pair of front reinforcing plates 37 is joined at the bottom thereof to the top surface of the side plates 35 and at the rear end thereof to the front surface of the base portion 31A of the member plate 31. Each front reinforcing plate 37 has a rectangular shape whose vertical dimension is larger than the horizontal dimension in the longitudinal direction of the body 11. Each front reinforcing plate 37 is joined to its associated side plate 35 and member plate 31 in such a position that its thickness direction is directed to the width direction of the towing tractor 10.

The frame of the body 11 has a first auxiliary plate 38 which extends above and forward of the member plate 31. The first auxiliary plate 38 is formed in an L-shape in cross section and extends in the width diction of the body 11. The first auxiliary plate 38 has a base portion 38A extending perpendicularly to the under plate 30 and an extension portion 38B extending from the upper end of the base portion 38A horizontally rearward. The base portion 38A of the first auxiliary plate 38 is joined at the lower end face of middle portion thereof as seen in the width direction of the first auxiliary plate 38 to the upper surface of the under plate 30 and at the lower end faces of opposite sides thereof to the upper surfaces of both side plates 35, respectively. The rear end face of the extension portion 38B of the first auxiliary plate 38 is joined to the front surface of the partition portion 31B of the member plate 31.

Thus, the member plate 31, each side plate 35, the base portion 38A and the extension portion 38B of the first auxiliary plate 38 cooperate to form a space S on its associated side of the body 11. The space S has a shape of a rectangular box and each front reinforcing plate 37 is disposed in such space S and surrounded by the member plate 31 and the first auxiliary plate 38. The front end face and the upper end face of each front reinforcing plate 37 are clear of (or in noncontact with) the rear surface of the base portion 38A and the lower surface of the extension portion 38B of the first auxiliary plate 38 without being joined to them.

As shown in FIG. 4A, the frame of the body 11 has a pair of second auxiliary plates 39 extending in the longitudinal direction of the body 11 between the front protector 36 and the first auxiliary plate 38. Each second auxiliary plate 39 is joined at the lower end face thereof to the upper surface of the under plate 30. Furthermore, each second auxiliary plate 39 is joined at the front end face thereof to the rear surface of the front protector 36 and at the rear end face thereof to the front surface of the base portion 38A of the first auxiliary plate 38.

Referring to FIG. 3, the towing tractor 10 has a rear suspension 40. As shown in FIG. 3, the rear suspension 40 has a pair of leaf springs 41 (only one being shown) each having a plurality of leaves 41A made of spring steel, stacked on top of each other in layers and fastened together by clips 41C at plural positions spaced in the longitudinal direction thereof.

In the frame of the body 11 to which the rear suspension 40 is mounted, a pair of rear reinforcing plates 43 are joined to the rear surface of the base portion 31A of the member plate 31 on the opposite sides thereof, respectively, as shown in FIGS. 3 and 4A. Each rear reinforcing plate 43 is formed in an L-shape in cross section having a first fixed portion 43A formed in a rectangular shape and extending vertically and a second fixed portion 43B formed in a rectangular shape and extending horizontally rearward from the upper end of the first fixed portion 43A. Each rear reinforcing plate 43 is joined at the front surface of the first fixed portion 43A thereof to the rear surface of the base portion 31A of the member plate 31.

As shown in FIG. 4B, the rear reinforcing plate 43 is joined to the base portion 31A of the member plate 31 so that the first fixed portion 43A of the rear reinforcing plate 43 is positioned on opposite side of the base portion 31A of the member plate 31 from the front reinforcing plate 37. The front reinforcing plate 37 is disposed on the opposite side of the base portion 31A of the member plate 31 from the rear reinforcing plate 43 at a position corresponding to the center of the first fixed portion 43A of the rear reinforcing plate 43 as seen in the width direction thereof. As a result, the first fixed portion 43A of the rear reinforcing plate 43 and its associated front reinforcing plate 37 are opposed across the base portion 31A of the member plate 31, and the rear reinforcing plate 43 and the front reinforcing plate 37 are formed integrally with the base portion 31A of the member plate 31.

Each rear reinforcing plate 43 is joined at the upper surface of the second fixed portion 43B thereof to the lower end face of its associated rear side member 33. As shown in FIG. 4A, the rear side member 33 is held in the front thereof between the upper surface of the second fixed portion 43B of the rear reinforcing plate 43 and the lower surface of the partition portion 31B of the member plate 31.

A pair of suspension brackets 42 are joined at the upper surfaces thereof to the lower surfaces of the second fixed portions 43B of the rear reinforcing plates 43. Each suspension bracket 42 has a horizontal plate portion 42A and a pair of support portions 42B that extend downward from the opposite ends of the plate portion 42A. As shown in FIG. 3, each leaf spring 41 is rotatably supported at the front end thereof by a pin 44 that extends through holes formed through the paired support portions 42B of the suspension bracket 42. The leaf spring 41 is mounted at the rear end thereof to the lower rear end of the rear side member 33 via a shackle 45. Thus, the rear suspension 40 is disposed in the body 11 of the towing tractor 10 and supports the rear axle housing 18 at the opposite ends thereof. In addition, the rear suspension 40 also supports the drive motor 17.

The front end of each leaf spring 41 is supported by the suspension bracket 42 connected to the member plate 31 and the rear side member 33 through the rear reinforcing plate 43. That is, each leaf spring 41 is connected via the suspension bracket 42 and the rear reinforcing plate 43 to the member plate 31 that is located just behind the floor F and forms the neck of the body 11.

The above-described embodiment offers the following advantageous effects.

(1) In the towing tractor 10 in which the front and rear wheels 15 and 16 receive upward force from the road surface and the body 11 receives load of the battery 13, stress concentrates in the body 11 at the member plate 31 between the floor F and the rear wheels 16. In the body 11 of the towing tractor 10 according to the above-described embodiment, the rear reinforcing plates 43 (the first fixed portions 43A) are joined to the rear surface of the member plate 31 (the base portion 31A) and the front reinforcing plates 37 are joined to the front surface of the member plate 31, so that the rear reinforcing plates 43 and the front reinforcing plates 37 are opposed across the member plate 31. Any stress concentrated in the member plate 31 is received by the front reinforcing plates 37 and the rear reinforcing plates 43. Therefore, the towing tractor 10 having the battery 13 forward of the operator's compartment 12 can reinforce the member plate 31 to prevent the deformation of the member plate 31.

(2) Each rear reinforcing plate 43 has the first fixed portion 43A and the second fixed portion 43B to form an L shape. The first fixed portion 43A is formed in a rectangular shape and joined to the member plate 31. The second fixed portion 43B is also formed in a rectangular shape and extends from the upper end of the first fixed portion 43A horizontally rearward. The first fixed portion 43A is joined to the member plate 31 and the suspension bracket 42 is joined to the second fixed portion 43B. The leaf spring 41 is supported by the suspension bracket 42. Any upward force received by the second fixed portion 43B from the leaf spring 41 acts rearward of the first fixed portion 43A with angled portion of the rear reinforcing plate 43 as the center of rotation. By forming the rear reinforcing plate 43 in an L-shape, the upward force from the leaf spring 41 is dispersed, so that stress concentration in the member plate 31 is relieved.

(3) Each rear reinforcing plate 43 has the first fixed portion 43A and the second fixed portion 43B to form an L-shape. The first fixed portion 43A is formed in a rectangular shape and joined to the member plate 31. The second fixed portion 43B is also formed in a rectangular shape and extends from the upper end of the first fixed portion 43A horizontally rearward. The leaf spring 41 is supported by the second fixed portion 43B via the suspension bracket 42. As compared to a case, for example, wherein the suspension bracket 42 is directly joined to the lower end face of the rear side member 33, the joint surface area of the suspension bracket 42 is increased, so that the suspension bracket 42 is joined with stability.

(4) The member plate 31, each side plate 35 and the first auxiliary plate 38 cooperate to form a space S having a shape of a rectangular box. Thus, any stress acting on the member plate 31 is received by the side plate 35 and the first auxiliary plate 38 which form the above space S with the member plate 31, as well as by the front reinforcing plate 37. Therefore, the member plate 31 is reinforced effectively.

(5) The paired second auxiliary plates 39 are joined at the rear end faces thereof to the front surface of the first auxiliary plate 38 and at the front end faces thereof to the rear surface of the front protector 36. Since the stress received by the first auxiliary plate 38 is also received by the front protector 36 via the paired second auxiliary plates 39, the stress in the first auxiliary plate 38 is dispersed while being transmitted toward the front protector 36. As a result, the member plate 31 is reinforced effectively.

(6) The paired front reinforcing plates 37 are not joined to the first auxiliary plate 38. The front end face and the upper end face of each front reinforcing plate 37 are clear off or in noncontact with the rear surface of the base portion 38A and the lower surface of the extension portion 38B of the first auxiliary plate 38, respectively. As compared to a case wherein the front reinforcing plates 37 and the first auxiliary plate 38 are joined to (or in contact with) each other, assembling of the front reinforcing plates 37 and the first auxiliary plate 38 is simplified, so that the need of paying attention to dimensional tolerances in assembling may be alleviated.

(7) The side plates 35 are provided on opposite sides of the body 11 thereby to improve the strength in the middle (between the front wheels 15 and the rear wheels 16) of the body 11. The side plates 35 are joined at the rear end face thereof to the member plate 31, so that the stress acting on the member plate 31 is dispersed in each side plate 35 and the member plate 31 is reinforced.

The present invention has been described in the context of the above embodiment, but it is not limited to the embodiment. It is obvious to those skilled in the art that the invention may be practiced in various manners as exemplified below.

In the embodiment, it is not necessary to join the rear end face of each side plate 35 to the front surface of the member plate 31.

In the embodiment, the rear end face of each second auxiliary plate 39 need not be joined to the front surface of the first auxiliary plate 38, and the front end face of each second auxiliary plate 39 need not be joined to the rear surface of the front protector 36, either.

In the embodiment, the front end face of each front reinforcing plate 37 may be joined to the rear surface of the first auxiliary plate 38. The upper end face of each front reinforcing plate 37 may also be joined to the lower surface of the first auxiliary plate 38.

In the embodiment, the front reinforcing plate 37 need not be formed in a rectangular shape, and the space S need not be formed in a rectangular box, either.

In the embodiment, each rear reinforcing plate 43 need not be formed in an L-shape, but may be formed only by the first fixed portion 43A joined to the member plate 31. In this case, each suspension bracket 42 is joined to the lower end face of its associated rear side member 33 directly.

What is claimed is:

1. A battery-powered towing tractor comprising:
   a front wheel and a rear wheel;
   a body having a floor formed between the front wheel and the rear wheel;
   a battery disposed in the body at a position between the front wheel and the floor;
   a member plate extending in width direction of the body for compartmenting a rear end of the floor in the body;
   a front reinforcing plate joined to a front surface of the member plate; and
   a rear reinforcing plate joined to a rear surface of the member plate, wherein the front reinforcing plate and the rear reinforcing plate are opposed across the member plate, wherein the rear reinforcing plate is formed in an L-shape having a first fixed portion joined to the rear surface of the member plate and a second fixed portion extending from the first fixed portion perpendicularly; and
   a suspension bracket formed in the body and only joined to the second fixed portion for supporting a suspension, without being joined to the member plate, wherein an upward force received by the second fixed portion from the suspension acts rearward of the first fixed portion with a right-angled connecting portion between the first fixed portion and the second fixed portion as the center of rotation.

2. The battery-powered towing tractor according to claim 1, further comprising a rear side member extending from the member plate rearward, wherein the second fixed portion is joined to a lower end of the rear side member.

3. The battery-powered towing tractor according to claim 1, wherein the battery-powered towing tractor includes a pair of the front reinforcing plates on opposite sides of the body, respectively, wherein each front reinforcing plate is disposed so that thickness direction of the front reinforcing plate is directed to the width direction of the body, and wherein the rear end of each front reinforcing plate is joined to the member plate.

4. The battery-powered towing tractor according to claim 3, wherein a first auxiliary plate is formed in an L-shape and extending in the width direction of the body and joined to the member plate, wherein the first auxiliary plate extends above and forward of the front reinforcing plate so that the first auxiliary plate and the member plate surround the front reinforcing plate.

5. The battery-powered towing tractor according to claim 4, wherein a pair of side plates each extending in longitudinal direction of the body are formed on opposite sides of the body under the floor, wherein each side plate is joined to lower ends of the front reinforcing plate and the first auxiliary plate.

6. The battery-powered towing tractor according to claim 4, wherein the front reinforcing plate is in noncontact with the first auxiliary plate therebetween.

7. The battery-powered towing tractor according to claim 6, wherein the member plate, each side plate, the first auxiliary plate cooperate to form a space on one side of the body, the space having a shape of a rectangular box.

8. The battery-powered towing tractor according to claim 4, wherein a front protector is formed in the body forward of the member plate for compartmenting a front end of the floor, wherein a second auxiliary plate is formed in the body and extended between the first auxiliary plate and the front protector.

\* \* \* \* \*